United States Patent [19]
Lybarger

[11] 3,948,324
[45] Apr. 6, 1976

[54] PROCESS FOR CHEMICALLY AND MECHANICALLY LIMITED RESERVOIR ACIDIZATION

[75] Inventor: James H. Lybarger, New Orleans, La.

[73] Assignee: Shell Oil Company, Houston, Tex.

[22] Filed: Feb. 18, 1975

[21] Appl. No.: 550,308

[52] U.S. Cl. .................................. 166/307
[51] Int. Cl.² ................... E21B 43/25; E21B 43/27
[58] Field of Search .......... 166/307, 281, 282, 271, 166/259

[56] References Cited
UNITED STATES PATENTS

| | | | |
|---|---|---|---|
| 2,215,487 | 9/1940 | Sutherlin et al. | 166/307 X |
| 2,367,350 | 1/1945 | Heigl | 166/307 |
| 2,784,788 | 3/1957 | Hughes et al. | 166/307 |
| 2,885,004 | 5/1959 | Perry | 166/307 |
| 3,254,718 | 6/1966 | Dunlap | 166/307 |

*Primary Examiner*—Stephen J. Novosad
*Assistant Examiner*—George A. Suckfield

[57] ABSTRACT

The fluid productivity of a relatively unconsolidated oil producing subterranean siliceous reservoir is improved by a limited flow rate sequential injection of oil solvent, relatively dilute hydrogen fluoride-free acid, and relatively dilute hydrogen fluoride containing-acid, and a gradual returning of the well to production.

3 Claims, 7 Drawing Figures

LOW PRESSURE GRADIENT

HIGH PRESSURE GRADIENT

HIGH PRESSURE GRADIENT

LOW PRESSURE GRADIENT

LOW PRESSURE GRADIENT

PROCESS FOR CHEMICALLY AND MECHANICALLY LIMITED RESERVOIR ACIDIZATION

BACKGROUND OF THE INVENTION

The invention relates to a well-treating process for increasing the rate at which fluid can be produced from an oil-productive relatively unconsolidated siliceous reservoir. More particularly, the invention relates to a reservoir acidizing process in which (a) the mechanical effects of injecting and subsequently producing reservoir treating fluids are limited by using relatively slow rates of fluid inflow and outflow and slow rates of change in the flow rates, and (b) the chemical effects of the treating fluids are limited by using fluids having relatively low concentrations and/or volumes.

The need for stimulating subterranean reservoirs, in order to increase their productivity, has been known and worked on substantially as long as oil has been produced. The stimulation problems are complex, particularly in respect to relatively unconsolidated siliceous reservoirs that contain clay. Numerous proposals and discussions have been published, particularly with respect to what kind of chemicals should be injected and which of the previously proposed treatments were actually beneficial.

SUMMARY OF THE INVENTION

The present invention relates to a well treating process for increasing the rate of fluid production from an oil-productive, relatively unconsolidated siliceous reservoir having an impaired productivity. Fluid is produced from the well at a rate induced by a drawdown that is capable of causing a selected relatively high rate of fluid production when the productivity is unimpaired. This establishes a "production-configuration" of the effective fluid flow channels that lead into the borehole of the well. A sequence of treating fluids is injected at rates that are kept below about 15 gallons per minute, so that no significant disruption of the production-configuration of flow channels is caused by the force of the inflowing fluid. The so-injected treating fluids consist essentially of relatively small slugs of (a) a liquid oil-solvent, (b) a relatively dilute aqueous acid that is free of hydrogen fluoride and is capable of dissolving calcite, and (c) a relatively dilute aqueous acid that contains hydrogen fluoride and is capable of dissolving silica. After the treating fluids have been injected, the fluid pressure within the borehole is gradually reduced at a rate such that at least about 30 days are required for the drawdown and/or rate of fluid production (each being caused by the lowering of the pressure in the borehole relative to that within the reservoir) to substantially equal the drawdown and/or rate of fluid production corresponding to the selected relatively high rate of fluid production for the well being treated.

DESCRIPTION OF THE INVENTION

Figure 1:
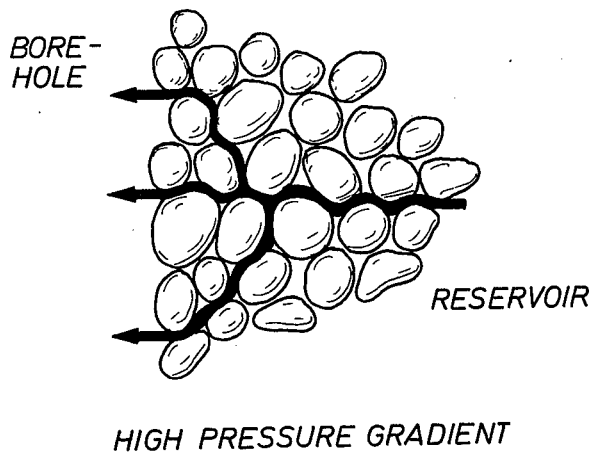
FIGS. 1 and 2 schematically illustrate effective flow channel configurations resulting from productions or injections of fluid in response to relatively high pressure gradients.

The present invention is at least in part premised on the following discovery. In a relatively unconsolidated oil-producing subterranean siliceous reservoir, unobviously beneficial results (in increasing the productivity of the reservoir) are provided by both mechanically and chemically limiting the reservoir-modifying effects of the injected treating fluids. The mechanical limiting is accomplished by (1) producing fluid in a manner establishing a production-configuration of effective flow channels, (2) injecting the treating fluids at rates causing substantially no disruption of that configuration, and (3) gradually returning the well to production. The chemical limiting is accomplished by using relatively small volumes of treating fluids or relatively dilute or relatively mild treating fluids. The beneficial results of the combination of the chemical and mechanical limiting steps were discovered in the course of relatively extensive series of comparative tests of the stimulations provided by the process of the present invention and those provided by prior processes. The results of the treatments were followed throughout relatively long periods of well productions.

As used herein, a "relatively unconsolidated oil-productive siliceous reservoir" refers to an oil productive reservoir which (a) is or is apt to become unconsolidated, (b) is or is apt to be responsive to at least one acidization with an aqueous acid that contains hydrogen fluoride and is capable of dissolving silica, and (c) has become or is apt to become increasingly impaired as fluid is produced from the reservoir.

In accordance with the present process, the flow channel networks within the subterranean reservoir and/or any adjacent sand or gravel pack are drawn into (or rearranged to form) a relatively stable production-configuration. This is done by producing fluid from the reservoir at a rate induced by a drawdown that is capable of causing a selected relatively high rate of production when the well productivity is unimpaired. As known to those skilled in the art, the productivity of a well (and/or the surrounding reservoir) is dependent on numerous factors over which a well operator has no control. Such factors include: the fluid mobility, which is mainly influenced by the composition and temperature of the fluid in the reservoir; the permeability of the unimpaired matrix of the reservoir; the degree of competency of the reservoir; and the like. In a given situation, as long as some fluid can be produced, the rate at which fluid is produced can be increased by increasing the drawdown. The "drawdown" is the amount by which the fluid pressure within the wellbore is less than that within the reservoir. In a given situation, the extent to which an increase can be made in the drawdown is limited. If the drawdown becomes too high, the reservoir formation near the borehole may be hydraulically displaced into the borehole and/or the rate of the inflowing fluid flow may become high enough to entrain pieces of the reservoir formation.

In general, the extent of the drawdown should be selected on the basis of the characteristics of an individual reservoir. It should provide a relatively high rate of fluid production that can be sustained (without damaging the well or the reservoir) as long as the productivity remains unimpaired. Where the reservoir is relatively unconsolidated, the production in response to such a drawdown will cause the reservoir formation materials to become relatively firmly packed in a production-configuration. The amount of a suitable drawdown can be significant. For example, where a well has been equipped with a cemented and perforated casing and a gravel-packed screen and liner, a drawdown providing a 1,000 psi differential between the pressures within the formation and the borehole can be tolerated in relatively unconsolidated reservoirs of the type encountered near the Gulf of Mexico.

When such a well is produced in response to such a drawdown the movable grains of sand and gravel tend to be urged toward the conduits or passageways in or around the well. This establishes the production-configuration of the effective fluid flow channels. And, that configuration tends to remain, although the flow rate may become relatively low, due to a permeability impairment.

Figure 2:
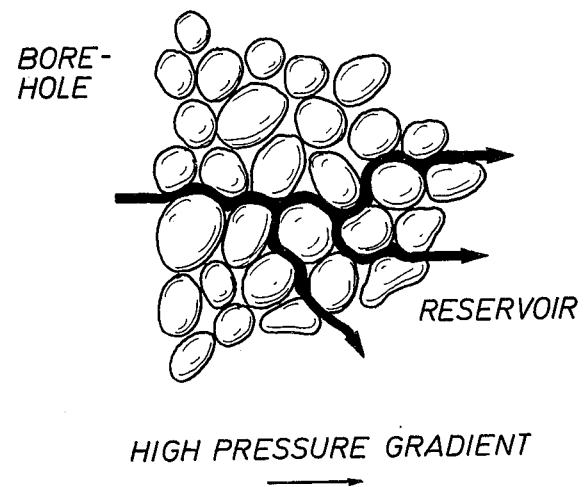
Figure 3:
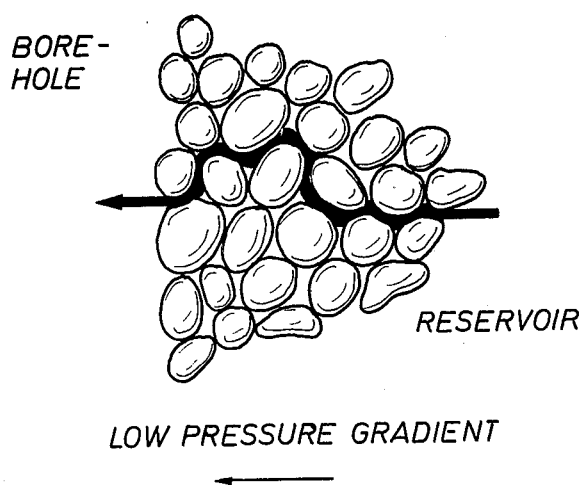
FIGS. 3 and 4 are similar illustrations of similar flow channel configurations in response to relatively low pressure gradients.
Figure 4:
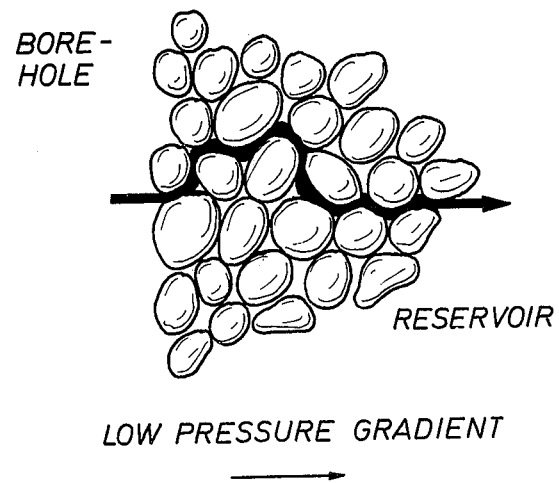

In a relatively unconsolidated reservoir, when a high rate of fluid flow is induced (for example in response to a high drawdown or high injection pressure) the sand grains tend to be displaced along the direction of the flow. As schematically illustrated in FIGS. 1 and 2, if a high rate of production is followed by a high rate of injection, the resulting shifting and repositioning of particles in the reservoir or pack may change the flow channels. During the production most of the fluid flow may occur within a different set of flow channels. In contrast, as shown by FIGS. 3 and 4, if the pressures and flow rates are kept low the flow paths tend to remain the same during the production and injection. In this case there is little or no shifting or displacing of the grains of sand or gravel.

In the present process the effective flow channels are drawn into a production-configuration and the treatment fluids are injected at a relatively slow rate so that the channels followed by the injected fluids are the same as, or are nearly the same as, those through which the fluids are produced. Thus, in order to avoid any significant mechanical or hydraulic disruption of the production-configuration of effective fluid flow channels, substantially all of the treating fluids are injected at rates of not more than about 15 gallons per minute, and preferably not more than about 10 gallons (or about ¼-barrel) per minute. Treatment fluid injection rates of about ¼-barrel per minute have been successfully used in treating reservoirs ranging from as little as about three feet in thickness to as much as about 100 feet in thickness. It appears that where a reservoir is thin, the total of the effective diameters of its relatively few flow channels allows the production-configuration to remain stable during the relatively slow injection of fluid. And, where the reservoir is thick, the effective diameters of its larger number of channels are relatively small and/or its flow channels are more sparsely distributed so the overall result is substantially the same. If a thick interval is densely permeated with large channels, its permeability is high and no stimulation is needed.

The liquid oil-solvent used in the present invention can be substantially any readily pumpable liquid that is capable of dissolving and removing the residual oil in and around a well. Preferentially oil-soluble liquids which are good solvents for high molecular weight paraffinic hydrocarbons and/or asphaltenes, are particularly suitable. Aromatic hydrocarbons, such as xylene and/or hydrocarbon fractions such as kerosene and diesel oil (where they are free of suspended matter), are particularly suitable. The volume of the oil solvent should be about 200–600 gallons (with a volume of about 400 gallons being preferred) regardless of the "length of the perforated interval." As used herein, the "length of the perforated interval" refers to the combined thickness of the one or more reservoir intervals that are opened in common fluid communication with a given production conduit, within the well.

A relatively dilute aqueous acid that is capable of dissolving calcite and is free of hydrogen fluoride suitable for use in the present process can be substantially any such aqueous acid which is capable of dissolving calcite (or the like alkaline earth metal carbonates) in and around the borehole. Such acid is preferably an aqueous solution of from about 7 to 15% of hydrochloric, formic, acetic, or the like, acids. As aqueous 10% hydrochloric acid is preferred. The volume of such an acid should be from about 250 to about 800 gallons for treatments of reservoir intervals up to about 100 feet in thickness. In Gulf Coast sands a volume of about 500 gallons of 10% hydrochloric acid is generally preferred, except where the reservoir is highly calcarious, or where calcium carbonate pills have been used, e.g., during a sand control installation or well work-over, or where the well is known to have a tendency to develop a scale of calcium carbonate, iron carbonate or other iron compounds, or the like.

As known to those skilled in the art, it is generally preferable to incorporate a polyvalent metal chelating agent, such as citric acid, or the like, in a polyvalent metal-removing slug of acid. A particularly suitable concentration of citric acid is about 15 pounds of the citric acid per 1,000 gallons of 10% hydrochloric acid.

The relatively dilute aqueous acid that contains hydrogen fluoride and is capable of dissolving silica (i.e., the "mud acid") used in the present process is preferably an aqueous solution of about 6–9% hydrochloric acid containing from about 1–3% hydrofluoric acid, with a ratio of 7.5 HCl to 1.5% HF being preferred. The preferred ratio has been found to be adequate with respect to effecting a near wellbore stimulation while avoiding the danger of causing the wellbore or formation damage or sand collapse that can result from using a mud acid of significantly greater concentration. In general, the volume of the mud acid should be from about 20–60 gallons per net foot of perforated interval (with the preferred amount being from about 25–50). However, in the upper Gulf Coast reservoirs, mud acid volumes exceeding a total of about 1500 gallons have seldom been found to be necessary, even in perforated intervals exceeding 60 feet.

In a particularly suitable embodiment of the present invention, part or all of the relatively dilute mud acid can be the self-generating mud acid described in U.S. Pat. No. 3,828,854 by C. C. Templeton, E. H. Street and E. A. Richardson. Such a self-generating mud acid comprises an aqueous solution of a fluoride salt and a relatively slowly reactive acid-yielding material which subsequently converts the salt solution to a hydrofluoric acid solution capable of dissolving siliceous material. In accordance with the present process, it is advantageous to employ at least some of such a self-generating acid so that it will penetrate a relatively long distance into the reservoir before it has generated much of the hydrofluoric acid. The latter tends to react rapidly and thus to become quickly spent.

In general, the present process is highly effective in increasing the productivity of a reservoir without requiring an overflushing treatment of the region contacted by the mud acid. However, the mud acid solution (preformed and/or self-generating) can advantageously be followed by small volumes of aqueous HCl (e.g., 3–15% concentration), diesel oil, water, etc. An aqueous solution containing about 3% ammonium chloride, substantially any soft salt water, diesel oil, or the like relatively inert fluid, in a volume sufficient to displace the mud acid out of the injection tubing string, is a preferred following fluid.

After the well treating fluids have been injected, the fluid pressure within the borehole is gradually reduced relative to that within the reservoir (continuously or in relatively small increments) so that at least about 30 days are required for the magnitude of the drawdown or the rate fluid production to become substantially equal to the drawdown or rate of fluid production of the relatively high rate of fluid production selected for the well. This ensures that the rates of change of the flow rates are relatively slowly changed from a slow rate of inflow into the reservoir to no flow, and then to a slowly increasing rate of outflow from the reservoir. As known to those skilled in the art, numerous procedures can be used to increase the drawdown in a well. For example, if the formation fluid pressure exceeds the hydrostatic head of the fluid used to displace the reservoir treating fluids into the reservoir, the drawdown can be increased by reducing the surface pressure that was applied to the displacing fluids, and the rate of production can be controlled by controlling the rate of outflow of fluid from the well. Where the reservoir fluid pressure is less than the hydrostatic pressure of the column of fluids in the well, the drawdown can be increased by bailing, pumping or gas-lifting fluid from the column of fluids. In a preferred embodiment, the drawdown is preferably increased by small increments based over a relatively long interval such as about three months. In a gas-lift well, the drawdown can be increased by increasing the amount of lift gas that is flowed into the well and then gradually increasing the rate of fluid flow from the well by increasing the size of the choke through which the fluids are outflowed.

Figure 5:
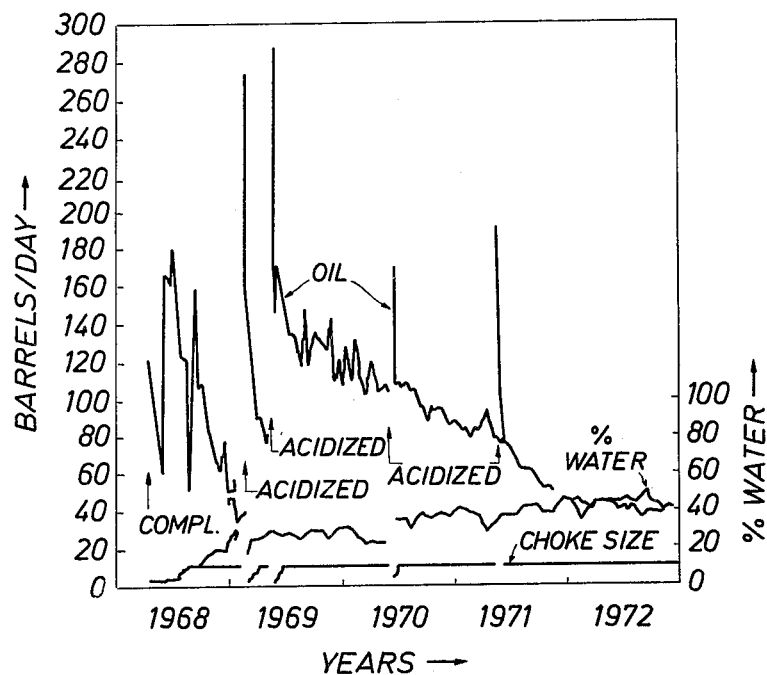
FIG. 5 shows a plot of fluid production responses with time after a series of conventional reservoir acidizations.

FIG. 5 illustrates a typical behavior of a well in the East Bay Field (South Pass Block 24 and 27 Field, Offshore Louisiana), in an oil-producing unconsolidated siliceous reservoir, where the well was subjected to a series of conventional acidizations. In that well, the reservoir depth was 5,600 feet, the net perforated interval thickness was 11 feet, and the reservoir temperature was 143°F. The well was completed Jan. 30, 1968, with a cemented and perforated casing and a gravel packed screen and liner for sand control. The well was acidized Feb. 1, 1968, and put on production. Initial flow rate tests were about 250 BPD clean oil. The well flowed without the aid of artificial lift and was choked back by a 13/64-inch choke due to depth allowables. The original bottom hole pressure was estimated to be 2500 psi, a flowing BHP of 1500 psi and a drawdown pressure on the reservoir of 1000 psi. As indicated in FIG. 5, by the end of 1968 the rate of production had sharply declined. A subsurface pressure survey indicated that the drawdown pressure on the formation had increased to about 1600 psi, indicating an accumulation of permeability damage around the well bore. The well was acidized four additional times, each time with properly inhibited mud acid comprising 12% hydrochloric acid and 3% hydrofluoric acid, and a volume ranging from 55 to 155 gallons per net foot of perforated interval. In each case, the mud acid was preceeded by aqueous 15% hydrochloric acid in a volume ranging from about 20 to 40 gallons per net foot of perforated interval. The injection rates ranged from 21 to 84 gallons per minute. As shown in the figure, these treatments did not materially stem the decline of productivity that was occurring in the well. Each acidization was progressively less effective.

Figure 6:
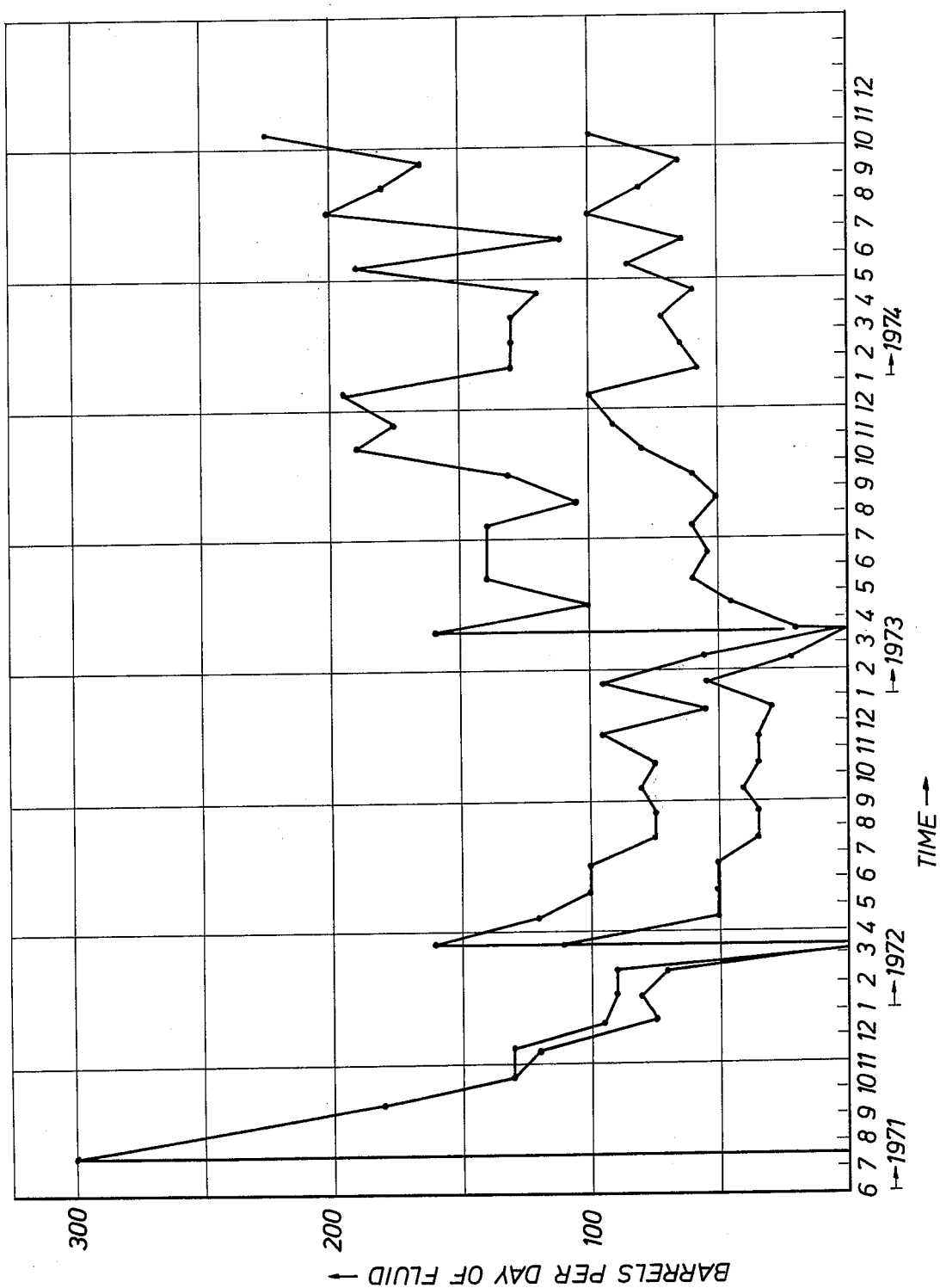
FIG. 6 shows a plot of fluid production responses with time after a conventional acidization followed by a treatment by the process of the present invention.

FIG. 6 shows a typical behavior of a different well in the same field after a conventional acidization followed by a treatment by the process of the present invention. The well was completed in an oil-producing unconsolidated siliceous reservoir at a depth of 7,050 feet, with a net perforated interval of 10 feet. This well was completed (in this zone) with a cemented and perforated casing and a gravel packed screen and liner (for sand control). The well was put on production in July 1971 and produced initially at about 300 BFPD (barrels fluid per day) rate on a 36/64-inch choke. As shown on FIG. 6, the fluid production had declined to about 100 BPD by December 1971. The well was conventionally acidized with mud acid comprising 12% hydrochloric acid and 3% hydrofluoric acid at a volume of about 150 gallons per net foot of perforated interval. The mud acid was preceded by aqueous 15% hydrochloric acid in a volume of about 65 gallon per net foot of perforated interval. As shown, by 3-½ months following the treatment the total fluid production had fallen below pretreatment rates, the water cut had increased and, by March 1973, the total fluid production had fallen to less than 80 BPD. At this time the well was acidized by the process of the present invention. This treatment used a low concentration mud acid comprising 7-½% hydrochloric acid and 1-½% hydrofluoric acid at a volume of 100 gallons per net foot of perforated interval. The mud acid was preceded by 500 gallons of xylene (50 gallons per net foot), and 250 gallons of aqueous 7-½% hydrochloric acid (25 gallons per net foot of perforated interval). The treating fluids were injected at a ¼-BPM rate (about 11 gallons per minute) and the well was opened on a 12/64th inch choke. The well was gradually opened up by increasing the choke size from 12 to 18 to 26 to 38 to 64-sixty fourths over a 2-½ month period, thus allowing the well to stabilize at the higher post-treatment flow rate. As shown, the well has continued to produce at the higher post-treatment rate without any sign of total fluid decline.

Figure 7:
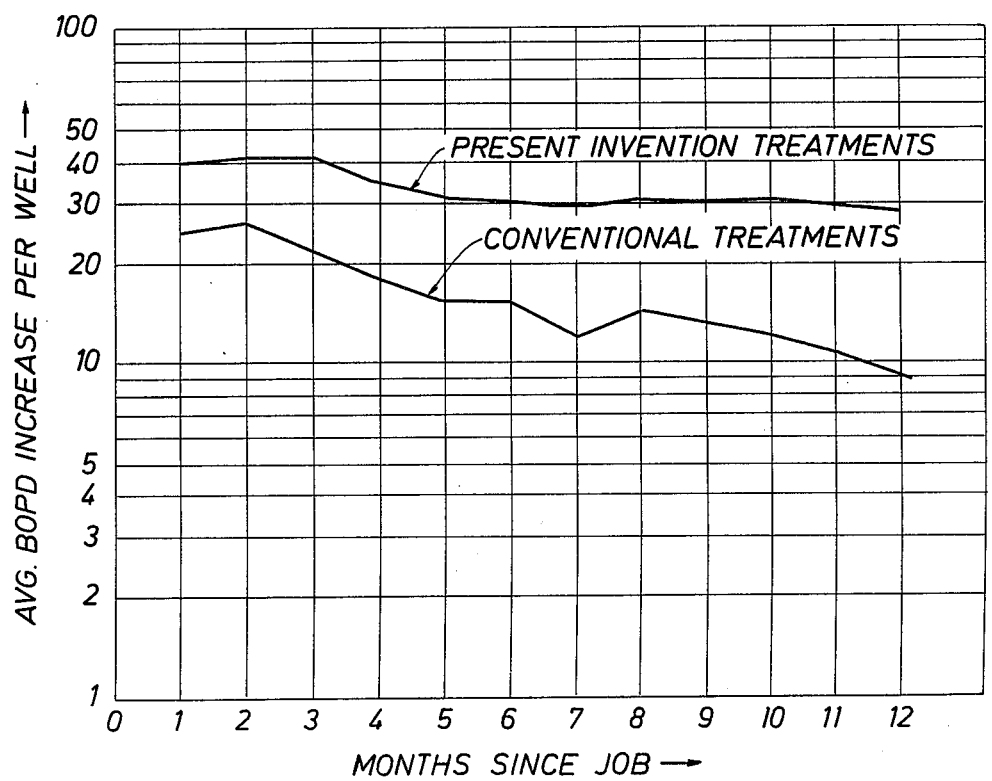
FIG. 7 illustrates plots of comparative average fluid production increases with time after acidizing the reservoir by, respectively, a conventional process and by the process of the present invention.

FIG. 7 shows the results of comparisons of 12 months production data on a total of 102 well treatments. Of those treatments 64 were conventional acidization treatments (of the type described in connection with FIG. 5) and 38 were treatments in accordance with the present invention (of the type described in connection with FIG. 6). The figure shows a plot of the average barrels of oil per day of the increased production per well (on logarithmic scale) provided by the stimulation treatments. The increased production is the difference between the average pre-treatment oil production and the average post-treatment oil production for the wells. By the end of the sixth month the average increase provided by treatments by the process of the present invention was 30 barrels of oil per day, as compared with only 12 from the conventional treatments.

What is claimed is:

1. A well-treating process for increasing the rate of fluid production from an oil-productive relatively unconsolidated siliceous reservoir, which process comprises:

producing fluid from the well at a rate induced by a drawdown of a selected magnitude that is capable of causing a selected relatively high rate of fluid production without damaging the well or the reservoir when the productivity of the well is unimpeded, in order to establish a production-configuration of the effective fluid flow channels;

injecting, through the well and into the reservoir, a sequence of treating fluids which are injected at flow rates that are controlled to maintain flows of less than about 15 gallons per minute, in order to avoid any significant disruption of the production-configuration of the effective flow channels;

including in the sequence of injected treating fluids a relatively small slug of each of a liquid oil solvent, a relatively dilute aqueous acid that is free of hydrogen fluoride and is capable of dissolving calcite, and a relatively dilute aqueous acid that contains hydrogen fluoride and is capable of dissolving silica; and after injecting the treating fluids, gradually reducing the fluid pressure within the borehole relative to that within the reservoir at a rate such that at least about 30 days are required for the magnitude of the drawdown or the rate of fluid production to substantially equal the magnitude of the drawdown or the rate of fluid production corresponding to the selected relatively high rate of fluid production from the well being treated.

2. In a well-treating process for increasing the rate of fluid production from an oil-productive relatively unconsolidated siliceous reservoir by (a) producing fluid from the reservoir at a rate induced by a drawdown capable of causing a selected relatively high rate of fluid production from the well without damaging the well or the reservoir when the well productivity is unimpeded, (b) injecting a sequence of treating fluids, and (c) gradually reducing the fluid pressure within the well relative to that within the reservoir to gradually provide a magnitude of drawdown or rate of fluid production substantially equaling the drawdown or rate of fluid production corresponding to the selected relatively high rate of fluid production, the improvement comprising:

injecting said sequence of treating fluids through the well and into the reservoir at flow rates that are controlled to keep them below about 15 gallons per minute; and including in said sequence of injected treating fluids (a) from about 200–600 gallons of a substantially water-insoluble liquid oil solvent; (b) from about 250–700 gallons of an aqueous acid that is free of hydrofluoric acid, is capable of dissolving calcite, and has a relatively low concentration that does not exceed a concentraton equivalent to an aqueous 15% by weight hydrochloric acid solution; and (c) from about 800–1800 gallons of a relatively dilute aqueous acid that has an effective hydrofluoric acid concentration equivalent to from about 1–3% by weight and an effective concentration of other acid not exceeding a concentration equivalent to that of an aqueous 15% by weight hydrochloric acid solution and is capable of dissolving silica.

3. A process for treating a well that opens into an oil-productive unconsolidated siliceous reservoir in order to increase the rate at which fluid is produced from the well in response to a drawdown that causes a selected relatively high rate of fluid production from the well without damaging the well or the reservoir when the well productivity is unimpaired, which process comprises:

establishing a production-configuration of the effective flow channels for conveying fluid from within the reservoir to within a production conduit in the well;

injecting into the well, at a rate of flow that is controlled to keep it low enough to avoid any significant disruption of the production-configuration of the flow channels, a slug of each of a liquid oil solvent, a relatively dilute aqueous acid that is free of hydrogen fluoride and is capable of dissolving calcite, and a relatively dilute aqueous acid that contains hydrogen fluoride and is capable of dissolving silica; and gradually reducing the fluid pressure within the borehole relative to that within the reservoir at a rate such that at least about 30 days are required for the magnitude of the drawdown or rate of fluid production to substantially equal the magnitude of the drawdown or rate of fluid production corresponding to the selected relatively high rate of fluid production from the well.

* * * * *